ATTENUATOR
Filed March 17, 1953
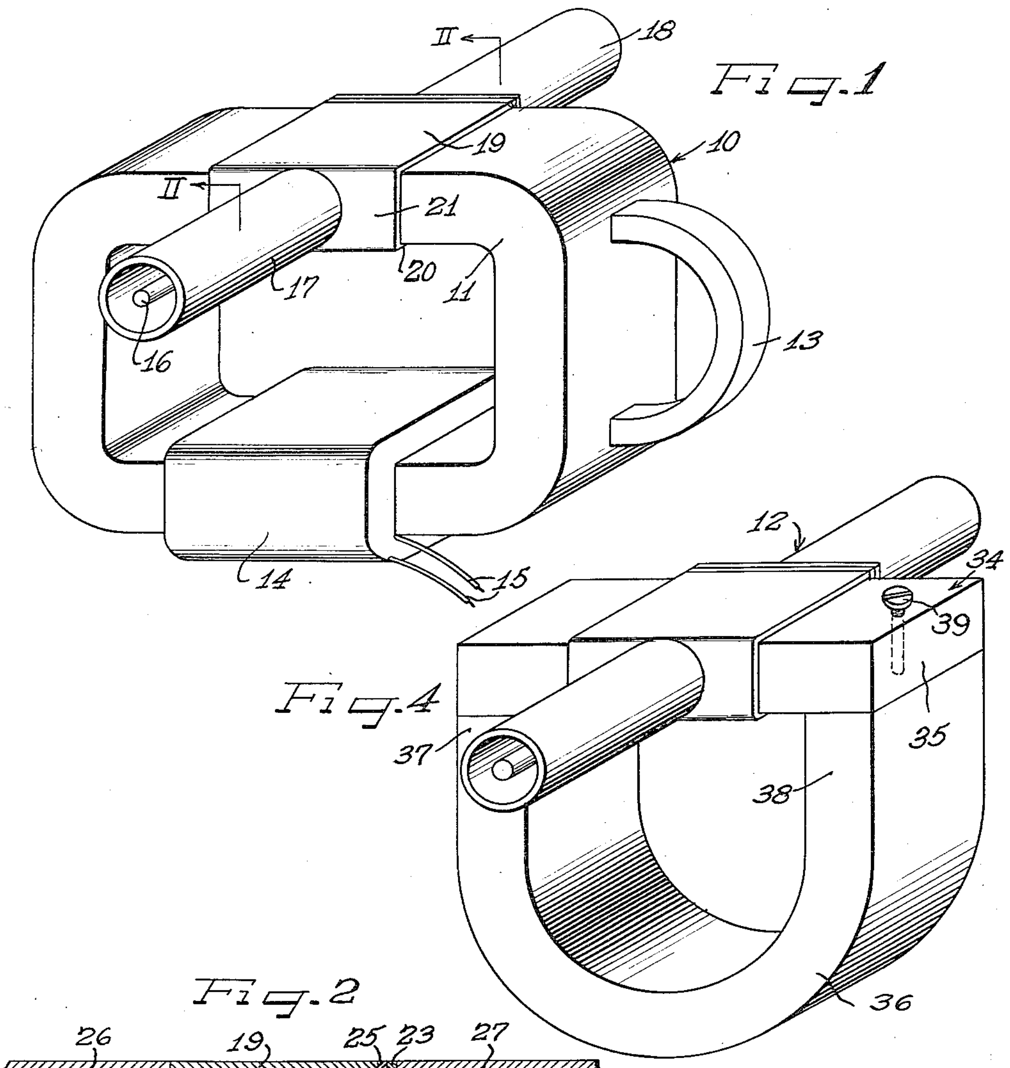
Fig. 1, Fig. 4
Fig. 2
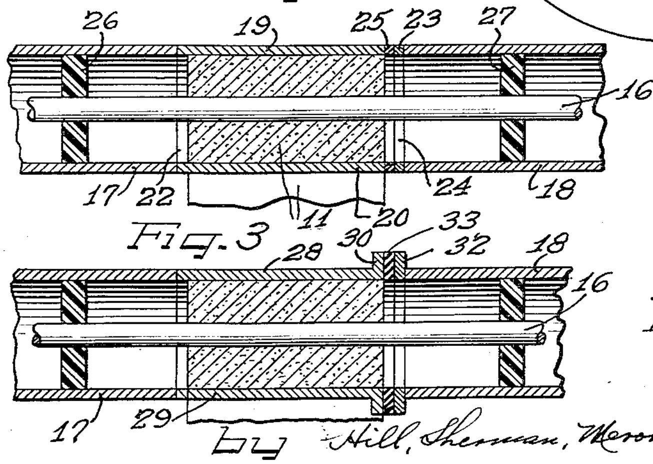
Fig. 3
Inventor
Ernest A. Jones
by Hill, Sherman, Meroni, Gross & Simpson Attys.

2,820,951
ATTENUATOR

Ernest A. Jones, Columbus, Ohio, assignor to Thompson Products, Inc., Cleveland, Ohio, a corporation of Ohio Application March 17, 1953, Serial No. 342,929

4 Claims. (Cl. 333—81)

This invention relates to an attenuator and more particularly to a variable attenuator for high frequency electro-magnetic energy.

This invention utilizes the properties of certain materials which attenuate high frequency electro-magnetic energy as a function of field strength in the material.

Matrixes of insulating material having magnetizable particles dispersed therein may be used, but ferrite materials which have excellent magnetic properties at high frequencies are preferred.

According to this invention, a closed magnetic flux path of high permeability material is defined, at least in part, by material having the above-mentioned properties and this material is placed in the path of transmission of high frequency electro-magnetic energy. A field may be induced in the closed magnetic flux path by any desired means such as, for example, a permanent magnet or an electro-magnet. The fact that the flux path is closed is highly important in that the strength of the field producing means required to produce a given flux density and a given attenuation is at a minimum. This feature is particularly advantageous where the invention is used to control attenuation in accordance with an audio signal, that is, where the high frequency energy is modulated, because it is highly desirable and in many cases essential that the amount of audio power required be at a minimum.

According to a specific feature of the invention, a pair of hollow conductors surround longitudinally spaced portions of an elongated conductor to define therewith a pair of transmission line sections and a member having the above-mentioned field-controlled attenuating properties is disposed intermediate the hollow conductors and in surrounding relation to the elongated conductor. The transmission line sections are connected through a pair of plates disposed in parallel relation between the hollow conductors and on opposite sides of the member so as to define an intermediate parallel plate transmission line section. By this feature, the portion of the transmission line in which the attenuating material operates may have the optimum characteristic impedance and other optimum characteristics at the range of high frequencies transmitted along the line. At the same time, it is possible to have a closed flux path of high permeability material without any air gaps so as to achieve maximum efficiency.

According to another specific feature of the invention, means are connected in series with at least one of the plates between the hollow conductors to define a capacitance having a low reactance in the range of high frequencies transmitted along the transmission line and a high reactance at frequencies below the range of frequencies transmitted. This feature is particularly advantageous where audio or other low frequency modulation is used since it prevents the possibility of an effective shorted turn in the flux path which would, of course, greatly reduce efficiency.

Still another feature of the invention is in the control of attenuation by means of a permanent horseshoe-shaped magnet which is disposed against a portion of the closed flux path and may be rotated into and out of alignment with the flux path to control the degree of attenuation. This magnet may preferably be used in connection with an audio-excited electro-magnet to control the amount of biasing flux.

A still further feature of the invention resides in the provision of a permanent magnet in the flux path with means for adjusting the length of the very small air gap in the path so as to control the attenuation.

Other features of the invention reside in structural details of the device by which it is readily manufacturable and highly efficient.

An object, accordingly, of the present invention is to provide improved means for controlling attenuation of high frequency electro-magnetic energy.

A more specific object of the present invention is to provide an improved device for attenuating high frequency energy in which means are provided defining a closed magnetic flux path of high permeability material intersecting the path of transmission of high frequency energy.

A further specific object of the invention is to provide a parallel plate transmission line section in the region where the field-controlled attenuating material is operative so as to secure optimum high frequency characteristics and, at the same time, have a closed magnetic flux path.

Still another object of the invention is to provide a parallel plate transmission line section for connecting a pair of coaxial line sections with the attenuating material passing between the parallel plates and with means preventing the possibility of an effective shorted turn at low frequencies.

This invention contemplates other objects, features and advantages which will become more fully apparent from the following detailed description taken in conjunction with the accompanying drawings which illustrate preferred embodiments and in which:

Figure 1 is an isometric view of a preferred form of attenuator constructed according to the principles of this invention;

Figure 2 is a sectional view taken substantially along lines II—II of Figure 1;

Figure 3 is a sectional view similar to Figure 2 but illustrating the somewhat modified construction; and Figure 4 is an isometric view of another preferred embodiment of the invention.

Reference numeral 10 in Figure 1 designates one preferred form of attenuator constructed according to this invention. The attenuator 10 comprises a ring 11 of a high permeability magnetic material which has a portion disposed in the path of high frequency electro-magnetic energy transmitted along a transmission line generally designated by reference numeral 12. A horseshoe-shaped permanent magnet 13 is disposed against a portion of the ring 11 and may be rotated into and out of alignment with the ring so as to control the magnetic field strength in the ring and the attenuation of energy transmitted along the transmission line 12. In addition, or in the alternative, a coil 14 is wound around a portion of the ring 11 and has a pair of terminal leads 15 which may be connected to any desired source of electrical current to induce a flux in the ring 11 and control the amount of attenuation along the transmission line 12. In a preferred arrangement, the coil 14 may be excited from a source of audio or other low frequency current to modulate the high frequency energy transmitted along the transmission line 12, the magnet 13 coacting with the coil 14 and providing a biasing flux.

The ring 11 may be of a number of different materials and still be operative for the purposes of this invention, However, ferrite materials have been found to give excellent results and are preferred, preferably at higher frequencies. Ferrite materials may have the chemical composition $Me^{2+}Fe_2^{3+}O_4$, where $Me^{2+}$ is a symbol of a divalent metal. Such materials may be considered cubic ferrites with the same crystal structure as $Fe_3O_4$, which is also the structure of the mineral spinel ($M_gAl_2O_4$) and is therefore called the spinel structure. Ferrites may be imagined as being derived from $Fe_3O_4$ by replacing the divalent ferrous ions by one or more divalent metal ions, e. g. Mn, Co, Ni, Cu, Mg, Zn or Cd.

Ferrites are usually prepared by a sintering process such as commonly employed in the ceramic industry. The component metal oxides are mixed, ground, usually pre-sintered and ground again, finally compressed into the desired shape with the necessary binders and sintered at a high temperature.

The transmission line 12 comprises an elongated center conductor 16 and a pair of hollow cylindrical conductors 17, 18 surrounding longitudinally spaced portions of the center conductor 16 to define therewith a pair of coaxial transmission line sections. As shown in Figure 2, a portion of the ring 11 surrounds the portion of the center conductor 16 which is intermediate the spaced outer conductors 17 and 18.

To provide for more efficient transmission of high frequency energy between the spaced transmission line sections and to structurally connect the transmission line and the ring, a pair of plates 19 and 20 are disposed in parallel relation on opposite sides of the center conductor 16. The plates 19 and 20 may be joined by an end plate 21 to the inner end of the outer conductor 17, the end plate 21 preferably having an opening 22 approximately the same diameter as the internal diameter of the conductor 17.

The inner end of the outer conductor 18 is secured to a plate 23 which is similar to the plate 21 and has an opening 24 of approximately the same diameter as the internal diameter of the conductor 18. The plate 23 might be integrally joined to the ends of the plates 19 and 20. However, if this were done, there would be a complete path of conductive material around the portion of the ring 11. If the flux through the ring 11 is varying, as where an audio frequency modulation is applied to the coil 14, this complete path of conductive material around the ring 11 would short out such frequencies and prevent the same from being effective in attenuating high frequencies transmitted along the transmission line 12.

By this invention, a capacitor is provided in series with at least one of the plates 19, 20 between the conductors 17, 18. This capacitor may preferably be defined by a thin plate 25 of dielectric material disposed between the plate 23 and the ends of the plates 19 and 20, thus forming a parallel plate capacitor.

It may be noted that the conductor 16 may be supported within the hollow conductors 17 and 18 by dielectric disks 26 and 27, respectively.

If the capacitor defined by the dielectric plate 25 and the facing surfaces of the plate 23 and the plates 19 and 20 does not produce sufficiently high capacitance, a modified arrangement such as illustrated in Figure 3 may be employed. In this modification, a pair of plates 28 and 29 having upstanding end flanges 30 and 31 are substituted for the plates 19 and 20, an enlarged plate 32 is substituted for the plate 23 and an enlarged dielectric plate 33 is substituted for the plate 25, thus providing enlarged facing surfaces and substantially greater capacitance. The remaining structure is, of course, the same as illustrated and described above in connection with Figures 1 and 2.

It may be noted that the parallel plate transmission line section is a very important feature of this invention because there is a greatly increased capacitance between the conductor 16 and the large areas of the plates 19, 20 or 28, 29 over what would be achieved with merely one or two wires bridging the gap between conductors 17 and 18 while the inductance is slightly decreased. This parallel plate section may thus have a low characteristic impedance and efficiently couple the coaxial sections which inherently have low characteristic impedances. Preferably, the characteristic impedance of the parallel plate section is substantially equal to that of the coaxial line sections so that there will be no reflections produced by the attenuator 10. It might also be noted that the parallel plate arrangement allows the use of a closed flux path of high permeability material so that maximum efficiency is achieved. In addition, the parallel plate arrangement is highly advantageous from the standpoint of manufacture and assembly. Furthermore, it might be noted that there will be very little energy radiated from the section.

Reference numeral 34 in Figure 4 designates another preferred attenuator constructed according to the principles of this invention. This attenuator utilizes the transmission line arrangement 12 as described above in connection with Figures 1 and 2 but uses a rectangular slab 35 of high permeability magnetic material in place of the ring 11 of the attenuator 10 of Figures 1 and 2. A horseshoe-shaped permanent magnet 36 has poles 37 and 38 disposed against the ends of the slab 35, thus providing a substantially closed flux path which is defined in part by the slab 35. To vary the flux in the slab 35, a screw 39 is threaded into one end of the slab 35 and engages the pole 38 of the magnet 36 to provide a small variable air gap between the slab 35 and the pole 38. If it should be desired that the flux in the slab 35 be varied in accordance with an audio or other low frequency signal, a coil may be wound around a portion of the slab 35 or around one of the poles 37, 38.

It will be understood that modifications and variations may be effected without departing from the spirit and scope of the novel concepts of the present invention.

I claim as my invention:

1. An attenuator, comprising: an elongated conductor, a pair of hollow conductors surrounding longitudinally spaced portions of said elongated conductor and defining therewith a pair of transmission line sections, means defining a closed magnetic flux path of high permeability material having a portion disposed intermediate said hollow conductors in surrounding relation to said elongated conductor, means for inducing in said flux path a flux variable at frequencies in a low frequency range, means connecting said outer conductors including a pair of plates on opposite sides of said portion, and means in series with at least one of said plates between said hollow conductors and defining a capacitance having a low reactance in the range of high frequencies transmitted between said transmission line sections and a high reactance at frequencies in said low frequency range.

2. A coaxial variable attenuator, comprising: a ring of ferrite material having at least a portion of rectangular cross-section, a first plate disposed against the inside surface of said portion of said ring, a second plate aligned with said first plate and disposed against the outside surface of said portion of said ring, a third plate disposed along one side of said portion and affixed to one end of said first plate and the adjacent end of said second plate, a fourth plate of insulating material disposed along the opposite side of said portion and against the opposite ends of said first and second plates, a fifth plate disposed against said fourth plate, said third, fourth and fifth plates having aligned apertures therein and said portion of said ring having a concentric opening therethrough, an inner coaxial line conductor extending through said opening and having portions projecting on either side of said portion of said ring, a pair of outer conductors secured to said third and fifth plates in concentric relation to said inner conductor, a coil wound around a portion of said ring and arranged for excitation at audio frequencies, and a permanent magnet having poles disposed against a portion of said ring.

3. An attenuator, comprising: an elongated conductor, a pair of hollow conductors surrounding longitudinally spaced portions of said elongated conductor and defining therewith a pair of transmission line sections, means defining a closed magnetic flux path of high permeability material having a portion disposed intermediate said hollow conductors in surrounding relation to said elongated conductor, means for inducing in said flux path a flux variable at frequencies in a low frequency range, means connecting said conductors including a pair of plates disposed in parallel relation on opposite sides of said portion and connected to one of said hollow conductors, and a member of dielectric material disposed between said plates and the other of said hollow conductors and defining therewith a capacitance having a low reactance in the range of high frequencies transmitted by the attenuator and a high reactance at frequencies in said low frequency range.

4. An attenuator, comprising: an elongated conductor, a pair of hollow conductors surrounding longitudinally spaced portions of said elongated conductor and defining therewith a pair of transmission line sections, means defining a closed magnetic flux path of high permeability material having a portion disposed intermediate said hollow conductors in surrounding relation to said elongated conductor, means for inducing in said flux path a flux variable at frequencies in a low frequency range, a pair of plates disposed in parallel relation on opposite sides of said portion and each connected at one end to one of said hollow conductors, the other ends of said plates having upstanding flanges thereon, a plate connected to the other of said hollow conductors and disposed in spaced facing relation to said flanges, and a thin sheet of dielectric material disposed between said flanges and the last-mentioned plate and cooperating therewith to define a capacitance having a low reactance in the range of high frequencies transmitted between said transmission line sections and a high reactance at frequencies in said low frequency range.

References Cited in the file of this patent

UNITED STATES PATENTS

| | | |
|---|---|---|
| 2,197,123 | King | Apr. 16, 1940 |
| 2,286,428 | Mehler | June 16, 1942 |
| 2,402,948 | Carlson | July 2, 1946 |
| 2,436,427 | Ginzton | Feb. 24, 1948 |
| 2,534,437 | Ginzton | Dec. 19, 1950 |
| 2,611,094 | Rex | Sept. 16, 1952 |
| 2,629,079 | Miller | Feb. 17, 1953 |
| 2,645,758 | Van De Lindt | July 14, 1953 |
| 2,670,461 | Learned | Feb. 23, 1954 |

FOREIGN PATENTS

| | | |
|---|---|---|
| 806,150 | Germany | June 11, 1951 |

OTHER REFERENCES

Reprint from the Technical News Bulletin of the National Bureau of Standards, August 1951, pages 110, 111.